United States Patent
Hayduk, Jr.

(10) Patent No.: US 6,847,964 B2
(45) Date of Patent: Jan. 25, 2005

(54) METHOD OF USING A COMPUTER TO FACILITATE DECISION MAKING

(76) Inventor: Edward A. Hayduk, Jr., 218 Main St., Kutztown, PA (US) 18530

( * ) Notice: Subject to any disclaimer, the term of this patent is extended or adjusted under 35 U.S.C. 154(b) by 390 days.

(21) Appl. No.: 09/961,830

(22) Filed: Sep. 24, 2001

(65) Prior Publication Data

US 2003/0061203 A1 Mar. 27, 2003

(51) Int. Cl.⁷ ............................................. G06F 17/30
(52) U.S. Cl. ................... 707/5; 707/3; 707/4
(58) Field of Search .................. 707/1–6, 10, 100, 707/7; 700/90; 345/700

(56) References Cited

U.S. PATENT DOCUMENTS

| | | | | |
|---|---|---|---|---|
| 5,278,980 A | * | 1/1994 | Pedersen et al. | 707/4 |
| 5,940,821 A | * | 8/1999 | Wical | 707/3 |
| 6,041,323 A | * | 3/2000 | Kubota | 707/5 |
| 6,411,950 B1 | * | 6/2002 | Moricz et al. | 707/3 |
| 6,581,056 B1 | * | 6/2003 | Rao | 707/5 |

* cited by examiner

Primary Examiner—Safet Metjahic
Assistant Examiner—Marc R Filipczyk
(74) Attorney, Agent, or Firm—RatnerPrestia

(57) ABSTRACT

This is a method of using a computer to facilitate decision making where a database can be searched with feed forward information provided to the user. A number of criteria are provided to a user of the system. Each time the user makes a particular selection from a choice of options in a given criteria, the system shows the user how many hits remain for each choice of options in each remaining criteria, based on the particular selection. Each time a particular selection is made within a criteria, the remaining choices are narrowed throughout all remaining criteria. Preferably, the criteria can be selected and/or prioritized by the user.

5 Claims, 9 Drawing Sheets

| CHARACTERISTIC | MY PRIORITY | MY CHOICE | MY MATCHES |
|---|---|---|---|
| Type of Tour (mountain, road, other) | 1 | Road | 152 |
| Location (country, region, state, etc.) | 2 | Mississippi | 8 |
| Price | 3 | | |
| Date Start, Date Stop | 4 | | |
| Meals (breakfast, lunch, dinner, etc.) | 5 | | |
| Support Level (none, fully, partially, other) | 6 | | |
| Difficulty Rating (1-5 w/ five being the hardest) | 7 | | |
| Age Grouping (youth, senior, other) | 8 | | |
| Average Mileage (not to exceed, other) | 9 | | |

| CHARACTERISTIC | MY PRIORITY |
|---|---|
| Type of Tour (mountain, road, other) | |
| Price | |
| Location (country, region, state, etc.) | |
| Date Start, Date Stop | |
| Support Level (none, fully, partially, other) | |
| Age Grouping (youth, senior, other) | |
| Meals (breakfast, lunch, dinner, etc.) | |
| Average Mileage (not to exceed, other) | |
| Difficulty Rating (1-5 w/ five being the hardest) | |

Fig. 1

| CHARACTERISTIC | MY PRIORITY |
|---|---|
| Type of Tour (mountain, road, other) | 1 |
| Price | 3 |
| Location (country, region, state, etc.) | 2 |
| Date Start, Date Stop | 4 |
| Support Level (none, fully, partially, other) | 6 |
| Age Grouping (youth, senior, other) | 8 |
| Meals (breakfast, lunch, dinner, etc.) | 5 |
| Average Mileage (not to exceed, other) | 9 |
| Difficulty Rating (1-5 w/ five being the hardest) | 7 |

Fig. 2

| CHARACTERISTIC/Topic | MY PRIORITY | MY CHOICE | MY MATCHES |
|---|---|---|---|
| Type of Tour (mountain, road, other) | 1 | | |
| Location (country, region, state, etc.) | 2 | | |
| Price | 3 | | |
| Date Start, Date Stop | 4 | | |
| Meals (breakfast, lunch, dinner, etc.) | 5 | | |
| Support Level (none, fully, partially, other) | 6 | | |
| Difficulty Rating (1-5 w/ five being the hardest) | 7 | | |
| Age Grouping (youth, senior, other) | 8 | | |
| Average Mileage (not to exceed, other) | 9 | | |

| CHARACTERISTIC | MY PRIORITY | MY CHOICE | MY MATCHES |
|---|---|---|---|
| Type of Tour (mountain, road, other) | 1 | Road | 152 |
| Location (country, region, state, etc.) | 2 | | |
| Price | 3 | | |
| Date Start, Date Stop | 4 | | |
| Meals (breakfast, lunch, dinner, etc.) | 5 | | |
| Support Level (none, fully, partially, other) | 6 | | |
| Difficulty Rating (1-5 w/ five being the hardest) | 7 | | |
| Age Grouping (youth, senior, other) | 8 | | |
| Average Mileage (not to exceed, other) | 9 | | |

Fig. 5

| Location | | Possible Matches |
|---|---|---|
| | U.S. | 42 |
| | Canada | 12 |
| | Central America | 10 |
| | Mexico | 4 |
| | Europe | 39 |
| | Asia | 15 |
| | Other | 30 |

| Location | | Possible Matches | | Possible Matches |
|---|---|---|---|---|
| | U.S | 42 | Alabama | 2 |
| | Canada | 12 | Mississippi | 8 |
| | Central America | 10 | OHIO | 3 |
| | Mexico | 4 | FLORIDA | 2 |
| | Europe | 39 | GEORGIA | 1 |
| | Asia | 15 | LOUISIANA | 1 |
| | Other | 30 | TEXAS | 5 |
| | | | OKLAHOMA | 1 |
| | | | NEBRASKA | 1 |
| | | | CALIFORNIA | 15 |
| | | | S. DAKOTA | 1 |
| | | | ALASKA | 2 |

Fig. 7

| CHARACTERISTIC | MY PRIORITY | MY CHOICE | MY MATCHES |
|---|---|---|---|
| Type of Tour (mountain, road, other) | 1 | Road | 152 |
| Location (country, region, state, etc.) | 2 | Mississippi | 8 |
| Price | 3 | | |
| Date Start, Date Stop | 4 | | |
| Meals (breakfast, lunch, dinner, etc.) | 5 | | |
| Support Level (none, fully, partially, other) | 6 | | |
| Difficulty Rating (1-5 w/ five being the hardest) | 7 | | |
| Age Grouping (youth, senior, other) | 8 | | |
| Average Mileage (not to exceed, other) | 9 | | |

Fig. 8

| PRICE | | Possible Matches |
|---|---|---|
| | < $500 | 0 |
| | $500 - $2,000 | 6 |
| | > $2,000 | 2 |

Fig. 9

METHOD OF USING A COMPUTER TO FACILITATE DECISION MAKING

FIELD OF INVENTION

The present invention relates to the use of a computer to facilitate decision making, and, more particularly, to a method of presenting information to a user of the computer.

BACKGROUND OF INVENTION

In the impersonal world of e-commerce, immediate and intelligent feed-forward to a consumer concerning his or her demands and choices is often lacking. Typically, a consumer of goods or services who uses a computer to find a supplier of goods or services, uses a global computer network (such as the Internet or its World Wide Web). During the consumer's search of the information available on the global computer network, the consumer often enters a choice or defines a need and if there are no available matches, the consumer simply gets an error message, or alternatively is told that no matches exist. This often leads to the consumer going elsewhere for his desired goods or services. An additional problem is that such impersonal, non-responses can lead to a decreasing likelihood that the consumer will look for help on the global computer network in the future.

Even where some feed-forward is given, many search tools and database searching programs simply give a blanket response of "hits" (hits are defined herein as the number of available matches which meet the user's input criteria). In such a case, even where a number of hits is presented, or a list of the results is provided, the user does not know which of the input criteria was the most or least limiting. This lack of intelligent feed-forward often leads to wasted time by the user, inefficient (or inaccurate) search results, and overall less value to all of the parties involved.

Take, for example, the situation where a user of the Internet finds a site and wishes to purchase an airline ticket. The user might enter for the search the two airports involved with the desired route, and the departure and return dates. The search might yield zero hits. At this point, the user has no idea why no flights match his criteria. It could be that all flights between the airports on those particular dates are booked. It could be that no flights are ever available between those two airports. It could be that a departure flight seat is available but that no return seats on the desired return date is available. In this situation, assuming the user wants to continue, he or she must guess at which criteria (i.e. airport selection, departure date, or return date) has caused the "zero hit" response. This is inefficient and frustrating for the consumer.

Furthermore, the above-described problem is magnified geometrically when more than two criteria are used. Imagine the situation where someone is trying to find a provider of a bicycle tour and this individual wants a mountain-bike trip through a Brazilian Rain Forest the first week of August. The provider of the trip must arrange for the food and supplies for the consumer, a spouse, and three young children at a total cost of less then $5000. Preferably, but not necessarily, the trip provider would pick up the consumer's family at the airport and put them up in a hotel the first night. Less important, but still preferred by the consumer, is that the food provided during the trip be authentic for that geographical area. This level of criteria, if entered all at once, or even incrementally, into a typical search method would often lead to frustration as the user of a conventional search method would never know which of the criteria was causing the limited number of hits (or, perhaps, no hits).

Therefore, an improved method would allow intelligent feed-forward to the user of the method so as to allow that user to make informed decisions and changes as the search progresses.

SUMMARY OF THE INVENTION

The present invention provides a method of using a computer to facilitate decision making. The method generally comprises the steps of (1) generating a database comprised of records for an identified subject matter; (2) presenting, on a computer screen, a first choice to the user searching the database, the first choice comprising at least one option and the corresponding number of matches in the database for each option; (3) providing means for accepting the user's selection from the first choice; (4) presenting a second choice to the user, the second choice comprising at least one option and the corresponding number of matches in the database available for each possible option in the second choice based on the user's selection from the first choice, and so on. This process continues until the user makes a determination to view the hits presented in the search.

In a preferred embodiment, the user of the method is first asked to prioritize the criteria of his search. This means that the user identifies his most important criteria or limitations first, and makes choices based on those priorities, before making choices on less important criteria, which may or may not need to be done in order to find a successful match. In this case, the user ranks a list of criteria in order of preference, and the first choice presented to the user once the search beings will be within that first (most important) criteria. Once that selection is made, the options within his second most important criteria are presented, with the number of possible hits for each option also presented. The possible number of hits presented for each option within that second choice, however, are limited by the user's selection made in his first choice. This process continues, and at each point along the way, the user is allowed to see the number of hits available for each of his possible next choices. Importantly, the number of hits available for each of his possible next choices is defined by the user's earlier choices. In this manner, the user is allowed to see what a particular decision will yield, giving him intelligent "feed-forward" information (as opposed to "feedback") throughout the decision making process.

BRIEF DESCRIPTION OF THE FIGURES

FIG. 1 is an exemplary screen provided to a user prior to the prioritization step in accordance with the present invention;

FIG. 2 is an exemplary screen provided to a user after the prioritization step in accordance with the present invention;

FIG. 3 is an exemplary screen provided to a user after the prioritization step but before any selections are made by the user in accordance with the present invention;

FIG. 5 is an exemplary screen provided to a user after the prioritization step and after a selection has been made by the user in accordance with the present invention;

FIG. 6 is an exemplary screen provided to a user prior to a selection of an option within a choice in accordance with the present invention;

FIG. 7 is an exemplary screen provided to a user prior to a selection of an option within a choice in accordance with the present invention;

FIG. 8 is an exemplary screen provided to a user after the prioritization step and after a second selection has been made by the user in accordance with the present invention; and FIG. 9 is an exemplary screen provided to a user prior to a selection of an option within a choice in accordance with the present invention.

DETAILED DESCRIPTION OF THE INVENTION

Figure 4:
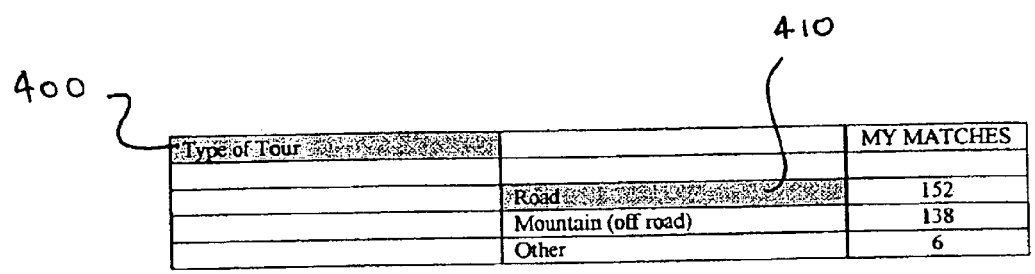
FIG. 4 is an exemplary screen provided to a user prior to a selection of an option within a choice in accordance with the present invention.

The present invention provides a method for allowing intelligent feed-forward information to the user of a computer who is searching a database. Throughout the search, the user is provided with the number of hits available for different options before being asked to make the decision. In addition, the number of possible hits presented is defined based on the user's previous decisions. More particularly, this method of using a computer to facilitate decision making comprises the steps of (1) providing access to a user of a database comprised of records for a desired subject matter; (2) presenting, on a computer screen, a first choice to the user, the first choice comprising at least one option and the corresponding number of matches in the database for each option; (3) providing means for accepting the user's selection from the first choice; (4) presenting, on the computer screen, a next choice comprising at least one limited option and the corresponding number of matches in the database for each limited option, the limited option being limited by the user's prior selection; (5) providing means for accepting the user's selection from the next choice; and (6) repeating steps (4) and (5) until the user either selects to view a record or chooses to stop searching.

In a preferred embodiment, the method begins by the method operator identifying a particular area of interest and generating or otherwise providing a database of selected records for that area of interest. The number of different databases is countless, and the design of the database can take any form, depending merely on the desire of the method operator. Commercially, the database would likely be a compilation of suppliers of goods or services. For example, the database could be comprised of different providers of bicycle trip tours all over the world. In such a case, each record in the database would have fields ranging from location, duration, cost, availability (which is updated periodically by the particular service provider through communication with the method operator), etc.

This database is then made available for searching by a user of the present invention. Depending on the particular database and the fields within each record, a list of criteria is developed by the invention operator. There is preferably a topic (also referred to as "characteristic") for each field within the database. This list of topics forms the basis for the search of that particular database.

In a preferred embodiment of the present invention, the user will be able to view a plurality of different topics to be used in the search. Each of these topics is essentially a field of the database being searched. The user can then rank, or prioritize, the topics before the search begins. In this embodiment, therefore, the user is allowed to deprioritize those topics which carry little weight or do not otherwise concern the user. The higher prioritized topics, on the other hand, are examined early, in the order defined by the user. In this way, if the user is absolutely limited in a particular field, or must have a particular criterion met, that topic is offered first.

The records comprising the database can be configured by the method operator in any number of ways. For purposes of this invention, the term, "record" has its general meaning of one of a plurality of elements within a database. For example, if the database consists of a plurality of different companies that offer bicycle tour trips, each company has its own record. Within each record is a plurality of fields. Each field contains information about the particular topic of that field. One field would be the name of the company. Another field would be the location of that company. Yet another field would be the location of the tours offered. Still yet another field would be the duration of each of the trips offered, and so on. In this way, a record is created for each service provider, each record containing pieces of information about that service provider and its offerings.

The "topics" offered for prioritization in the preferred embodiment discussed above are essentially the fields of each record of the database. In this way, the user can select which fields he or she wishes to define early, thus limiting the search quickly by those topics which are of higher interest. For example, if one field of the record is cost, a second field is location, and a third field is date of departure, the user might select to prioritize cost over date of departure and location, but location over date of departure, thus ranking the three potential choices as cost, location, and date of departure. In such a case, the user first limits the search to cost, which might be the most limiting factor. In this case, the user might not care as much about the date of departure, as long as the trip is to somewhere in California.

In this example, the user sets the cost at $500. This automatically limits all future possible hits to those whose cost field indicates a cost of less than $500. By selecting cost first, and defining the search by trips which do not exceed $500, the next choice presented for selection will only provide the number of each location options for those trips which do not exceed $500. In other words, the next group of options presented for selection will have automatically precluded those trips which cost more than $500. Then, the user would view a list of locations along with the number of trips to each location which cost less than $500. The user might select "California" if any such trips were available. If none were available, the user would know that he or she either needs to spend more money or select an alternative destination. Assuming that a number of trips to California are available for less than $500, the user would define California as his destination.

The next choice presented for selection would comprise a group of options showing departure dates for trips to California which cost less than $500, and the number of trips having each particular departure date. By showing the number of trips having each particular departure date, the user can intelligently choose the trips which have the desired departure date. If zero trips are available for a particular departure date, the user knows this before making a selection. Having then considered the number of trips available with each particular departure date, the user would then select that group of trips having a desired departure date. The user could then, at his option, view the trips which have a desirable departure date. Viewing the search results is discussed in more detail below.

The are a number of ways in which the user can manifest a selection or choose to view the search results. Preferred among these ways is that the method operator would present a box or otherwise indicate that the user could move a mouse or other such pointing device over a particularly designated part of the computer screen and click the pointing device. Such methods of allowing a user to manifest a desire are well known to those skilled in the art.

In one embodiment of the invention, the records in the database comprise a compilation of service providers for a particular service. The database is maintained on a central server controlled by the method operator. In such a case, each participating service provider's computer readable pages (defined herein as "web site") are maintained within the central server. This allows the presentation of the web sites (either complete or partial pages) to the user once the user is finished searching and wishes to look at the search results. This option is available to the user throughout the method; in other words, the user does not have to go through all criteria before viewing information on the results.

The method operator also may have a link to each web site's complete material. This would allow the user to leave the method operator's server and go to the desired complete web site if the user so chooses. All of these choices are manifested through known methods such as moving a pointing device over a particular box presented on the user's computer screen and clicking.

In a preferred embodiment of the present invention, once a search result is achieved to the satisfaction of the user, the user is able to visit the web page(s) associated with the search result(s). All selected web pages can be maintained in the method operator's server, so the user is not required to visit the web site of each successful match found in the search. The web pages maintained on the method operator's server are preferably capable of being updated by the web site owner so that all information contained on the site is current. Also preferred is the ability of the web site owner, who also has a record within the database, to access and update its respective record. This feature insures that all information available to the user is current. Access and changeability of the information contained in both the database and web pages is done through methods known to those skilled in the art.

In yet another embodiment, each option within a choice may present additional options to the user. In this embodiment, each selection by the user of a particular option leads to the presentation of additional options. In such an embodiment, each choice presented actually comprises the progressive presentation of several choices from a series of narrowing options. For example, and as will be seen in more detail below, a choice may be provided as "location." Within that choice, one option may be "U.S." and another option "South America." Once the user drags a pointing device over a particular selection, or otherwise manifests a selection, further options may be presented. In the case of selecting between "U.S." and "South America," the user might drag a pointer over "U.S." and be given further choices broken down by region such as 'Western' and 'Eastern.' Upon dragging the pointing device over the option 'Eastern,' a user might be shown yet additional options such as a list of eastern U.S. states, and so on. This way, within each topic, there may be several choices to make, among increasingly narrow options.

EXAMPLE

FIG. 1 shows an example of a screen that would be presented to the user of the present invention if the user were looking to book a bicycle tour. This particular screen is optional, but allows the user to enter his or her priority for each of the criteria provided. This screen would usually be made available via the Internet, or some related global computer network. The user could either begin searching by looking at the first choice, "Type of Tour (mountain, road, other)" and the number of hits available in the database for each type. There exist a variety of ways known to those skilled in the art that the user of the computer network could view the options within this choice, and those will be described in more detail below.

Before viewing his options within the first criteria, however, the user (in this embodiment) can prioritize the criteria to meet his preferences. FIG. 1 shows an example of the screen that would allow the user to make a prioritization. FIG. 2 shows the same table after the user has input (typically through a keyboard or mouse, or any of a number of different means known to those skilled in the art) the priorities. FIG. 3 shows an example of the next screen that might appear, with the priorities now arranged in the order directed by the user.

In this particular example, the user has decided that the type of tour is the most important criteria for the search, with location and price being second and third most important. Conversely, age grouping and average mileage are of lesser concern.

At this point, the user would be ready to begin the search. The user can begin the search in any number of ways known to those skilled in the art, but preferably by mouse clicking on the words "Type of Tour" shown in the first box 300 of FIG. 3. This would lead to the presentation of a screen as depicted in FIG. 4. This screen presents three options to the user within this choice. If the user is definitely interested only in road tours, he or she would indicate this selection by clicking or otherwise inputting that decision. Again, a number of ways exist to allow the user to manifest the decision, and include, besides simply clicking on the words, a button (not shown) presented in conjunction with the screen of FIG. 4 to allow the user to key in or otherwise indicate a choice.

In the example shown in FIG. 4, the user is also shown the number of available tours in the database which offer each of the type of tours listed. In this instance, the user is interested in road bike tours, and selects this choice by any number of means, some of which have been described above. FIG. 4 shows that box 400 and box 410 are highlighted. Such a responsive indicia is helpful to let the user know that the computer has registered the selection.

Now that the user has indicated that he or she is interested in road tours, the search continues. The screen shown in FIG. 5 is presented to (1) confirm that the user has selected road tours as the type of tour of interest, (2) confirm that there are 152 possible road tours within the database, and (3) to show that the next choice the user will be asked to make regards location. The user then clicks or otherwise manifests a desire to select from the different options within location, and the search continues.

FIG. 6 shows a preliminary breakdown of all of the available locations within the database that offer road tours. This page would likely be different had the user selected mountain bike tours, but because the user has already limited the search to road bike tours, only those locations with available road bike tours are shown. By viewing this page, the user knows that 42 road bike tours are available in the U.S., 12 in Canada, etc. As shown in FIG. 6, the user has manifested the desire to have a road tour in the U.S. by highlighting box 600. Again, any number of means of highlighting box 600 are available and known to those skilled in the art, typically by a mouse (or other pointing device) click.

FIG. 7 demonstrates the situation where the user has clicked on box 600 of FIG. 6, indicating a desire for a tour in the U.S., and the next level of options within the location criteria is made available. Before the user is asked to define the state which is of interest, the listing of which states comprise the 42 total U.S. tours are shown. FIG. 7 illustrates the example where the user has selected Mississippi as the location. Because only certain states are available in the database as offering road tours, the user does not waste time by trying to seek tours in, for example, Oregon, because he can see that no road tours are offered in Oregon.

Important in the present invention is the fact that user is receiving feed-forward at each stage of the search. For example, if the user wanted to tour in Oregon, he or she might decide to stop the search, back up a step, and change the "road bike" selection to "mountain bike" and then see if there are any mountain bike tours offered in Oregon within the database. Unlike prior art search tools, the user knows that the desired selection of "Oregon" is what has stopped the search and will provide "zero" hits. The user can then back up and change some other criteria, or leave the sight knowing what is available.

Returning now to FIG. 7, however, the user has decided to pursue road tours in Mississippi. By highlighting box 700, the user manifests the intent to continue the search for road tours in Mississippi. The next screen that appears is shown in FIG. 8, a screen similar to that shown in FIG. 5 but with the "Mississippi" selection now established. The next step will be for the user to look at prices among the 8 Mississippi road tours. FIG. 9 shows an exemplary screen where the user sees the breakdown of the 8 available tours in terms of price. Here, if the user cannot spend more than $500, he or she knows that it will be necessary to back up and change some earlier selection, because there are no road tours in Mississippi available for under $500.

This process continues until the user reaches a point where he or she either leaves the search tool or chooses to look at the records or web sites of the available tours. It may be, in the example, that the user would not have minded spending time looking at all eight (8) available road tours in Mississippi. Means are provided, throughout the search, to allow the user to exit the search screens (as shown in FIGS. 1–9) and view the selected search results.

The search could conclude in a number of ways. In one embodiment, the search may conclude with a selection of one bike tour being identified by the user. Information about that provider would then be made available to the user, possibly by making the selected provider's web site available to the user. Alternatively, the method operator's server could directly provide the information for the selected provider. In either event, the user can then contact the selected provider to arrange a booking. Alternatively, the search could result in the user re-evaluating the criteria and selections in order to arrive at a more preferred outcome.

The present invention has application for virtually any type of database, not just service providers. The same intelligent feed-forward, stepwise searching can be performed, for example, if someone is considering the purchase of a used car. The database in such a case is comprised of the used cars, and would include such things as model, year, mileage, price, color, etc. Then, the user would prioritize the available criteria or topics and begin making selections between options within each criterion, just as in the examples considered above.

In yet another alternative embodiment of the present invention, the user might be given the opportunity to select between a basic search or an advanced search. The advanced search would have more potential choices from which the user can select defining options. For example, if the user is only interested in finding a particular service provider who fixes automobile brakes in Philadelphia, he or she would not need as detailed a list of potential choices as someone who was interested in finding someone within walking distance of a particular block in Philadelphia who could come to the user's car to fix the brakes within a day for less than $200. This later desire requires a greater number of selections among different options than the first. In a preferred embodiment of the present invention, the user can switch between different levels of search criteria offerings during the search if the user finds that more detailed information would yield better results.

The present invention has been set forth with regard to several preferred embodiments, but the full scope of the invention should be ascertained by the claims which follow.

What is claimed is:

1. A method of using a computer to facilitate decision making by a user of the computer, said method comprising the steps of:

(1) providing a database comprised of records;

(2) providing means for a user to view a list of topics relevant to said records;

(3) providing means for the user to prioritize said topics before any search begins;

(4) presenting, on a computer screen, said topics in the order defined by the user in step (3);

(5) presenting, on a computer screen, a first choice to the user searching said database, said first choice comprising at least one option within said first prioritized topic shown on the screen in step (4), and the corresponding number of matches in said database for each said option;

(6) providing means for accepting the user's selection from said first choice;

(7) presenting, on said computer screen, a next choice comprising at least one limited option and the corresponding number of matches in the database for each said limited option, said limited option limited by said user's prior selection, wherein the topic of said next choice is defined by the prioritization that occurred in step (3);

(8) providing means for accepting the user's selection from said next choice; and (9) repeating steps (5) and (6) for each topic prioritized by the user in step (3) in the order defined by said prioritization, until the user either selects to view a record or chooses to stop searching.

2. The method of claim 1 wherein step (1) comprises providing access via a global computer network.

3. The method of claim 1 further comprising the step of:

(10) providing means for the user to view said records in said database at any time during said search.

4. The method of claim 1 wherein said first choice comprises a series of several selections from a series of narrowing options.

5. The method of claim 1 wherein said next choice comprises a series of several selections from a series of narrowing options.

* * * * *